United States Patent [19]

Hardtke

[11] Patent Number: 4,613,119
[45] Date of Patent: Sep. 23, 1986

[54] SUSPENSION DEVICE WITH A COMPENSATORY SPRING SYSTEM

[75] Inventor: Hans-Herlof Hardtke, Zeven, Fed. Rep. of Germany

[73] Assignee: LISEGA Kraftwerkstechnik GmbH, Fed. Rep. of Germany

[21] Appl. No.: 762,288

[22] Filed: Aug. 5, 1985

[30] Foreign Application Priority Data

Jan. 22, 1985 [DE] Fed. Rep. of Germany ....... 3501853

[51] Int. Cl.⁴ .............................. F16F 1/2; F16L 3/16
[52] U.S. Cl. .................................... 267/172; 248/613; 267/178
[58] Field of Search ................. 248/60, 575, 576, 594, 248/613; 267/166, 167, 170, 172, 173, 175, 177, 178, 179

[56] References Cited

U.S. PATENT DOCUMENTS 3,207,496  9/1965  Hrebicek ............................ 267/172
3,588,010  6/1971  Liesegang ...................... 248/613 X
3,789,948  2/1974  Hrebicek ......................... 267/172 X Primary Examiner—Duane A. Reger
Attorney, Agent, or Firm—Diller, Ramik & Wight

[57] ABSTRACT

A suspension device for suspendingly supporting loads under a generally constant spring-biasing support force defined by two relatively movable portions, a first of the portions being secured to a support and a second of the portions being secured to a load to be suspendingly supported thereby, a main spring for biasingly mounting the first and second portions relative to each other, the second portion being an elongated member having an upper end portion, at least one compensatory spring adjacent the upper end portion of the elongated member, a pivoted lever between the one spring and the elongated member upper end portion, and a cam and cam follower carried by the lever and its elongated member upper end portion which compensates the tension and/or compression forces of the main spring as the cam and cam follower operate relative to each other.

20 Claims, 6 Drawing Figures

SUSPENSION DEVICE WITH A COMPENSATORY SPRING SYSTEM

This invention relates to a novel suspension device for suspendingly supporting loads under a generally constant spring-biasing support force, and the suspension device is particularly adapted for suspendingly supporting pipes.

The suspension device includes a first portion which is adapted to be secured to a support and a second load-bearing portion to which is connected a particular load, such as a plurality of pipes. A main biasing force or spring provides biased suspension for the load, and in keeping with the present invention an additional spring system is provided for compensating for variations in the tension/compressive forces of the main spring system. This additional or compensatory spring system utilizes a helical or leaf spring as the compensatory biasing force which operates through a lever, its associated cam and a cam follower carried by the load-supporting element of the suspension device.

Germam OS 26 23 929 discloses the utilization of additional springs which are in parallel adjacent to the main springs of a suspension system, together with an angular lever having a stationary axis which serves as a transmission member between the main spring system and the additional springs through appropriate cam portions. Such a suspension device is responsible for stabilizing the overall system because of variations in load and, thus, avoids undesired oscillating movements while the cam/cam portions of such known systems include inaccuracies that are not necessarily divisive on the overall operation of such conventional spring systems. However, complexity is created in this system because of the necessity of connecting rods associated with the angular levers which act on displaceable abutments of the added or compensatory springs. Thus, though some advantages may be achieved by such known systems, other disadvantages are clearly apparent, as, for example, the width of such systems are quite considerable even though the overall height might be considered acceptable. Generally speaking, the costs of manufacturing conventional suspension systems as aforesaid is rather high.

In view of the foregoing, the present invention is directed to a suspension system which has desired compensatory mechanisms which are stable and quiet in operation, relatively compact and are relatively inexpensive both to manufacture and to repair, should such be found necessary, due to the simplicity of construction and the minimum number of parts involved. The invention is characterized predominantly in the utilization of one or more levers carrying cams which are disposed between compensatory springs and the main suspension springs of the suspension device.

Due to the configuration of the present suspension device of this invention, the total height can be reduced over known constructions, particularly when the levers are supported in a generally upright position with the pivot points at a relatively lower level, namely, generally between opposite ends of the main suspension spring and/or the elongated supporting member associated therewith. Furthermore, as compared to prior art designs, the limited number of levers (two) and springs (two) ease both the costs of manufacture and the costs of repair, and even the simplicity of the levers permits that they be mounted in the absence of conventional bearings. Thus, the levers can simply be accurately machined and pivoted to pivot pins of the overall suspension device housing which avoids the utilization of precision bearings and the attendant costs thereof.

The levers can also be mounted with their pivots uppermost, rather than lowermost, but in each case the cams thereof are preferably disposed adjacent followers carried by a head of the elongated suspension support of the overall device. This resultant construction is compact both as to its overall height and its overall width.

In further keeping with the invention, adjusting means are provided in the form of screws carried by the levers or the springs such that the force of the springs, be they helical or leaf springs, can be readily adjusted to compensate for the main spring loading. The additional springs are preferably separately adjustable and even when disposed in the housing, they are readily accessible, particularly the adjustment means provided with the helical springs. Due to such adjustment, the main spring may be maintained centralized and the zero or null position thereof can be adjusted to ensure that the main springs situated in the apex height of the associated cam portions of the levers act on the latter. This permits maximum compensation for both tension and compressive forces and accomplishes the same in the absence of expensive/added guide structure.

Preferably, the cam and cam follower means are effectively provided by forming the levers with integral cam and the upper end portion of the main suspension support with a head carrying rollers.

With the above and other objects in view that will hereinafter appear, the nature of the invention will be more clearly understood by reference to the following detailed description, the appended claims and the several views illustrated in the accompanying drawings.

In the drawings:

FIG. 1 is a longitudinal sectional view through a novel suspension device of the present invention for suspendingly supporting loads under a generally constant spring-biasing support force, and illustrates a main spring surrounding a support column from which a load is suspended, two compensatory helical springs and levers having cams disposed between the compensatory springs and roller followers of the main support.

Figure 1:
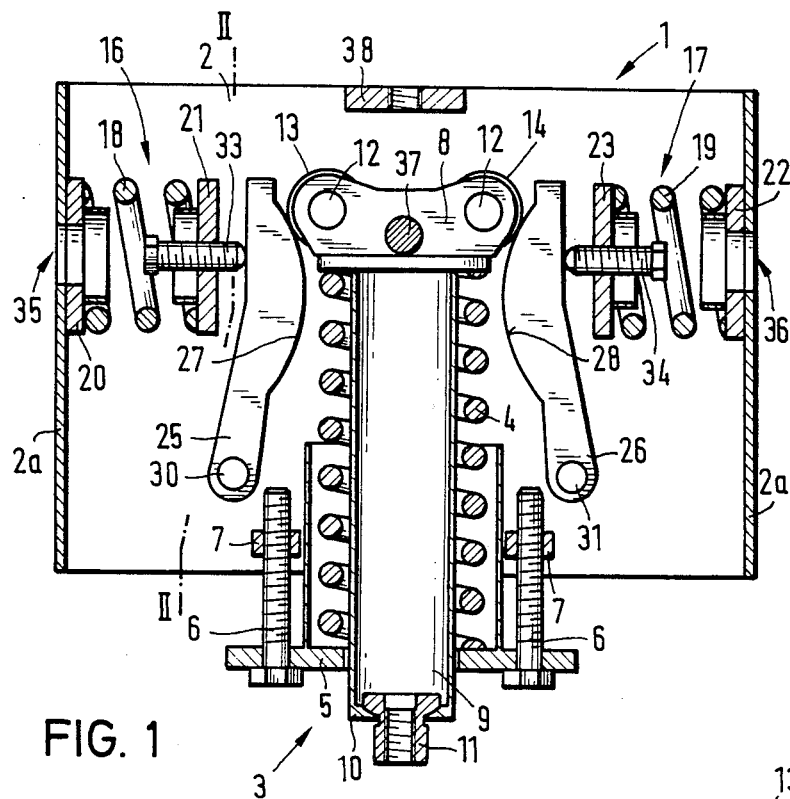
Figure 2:
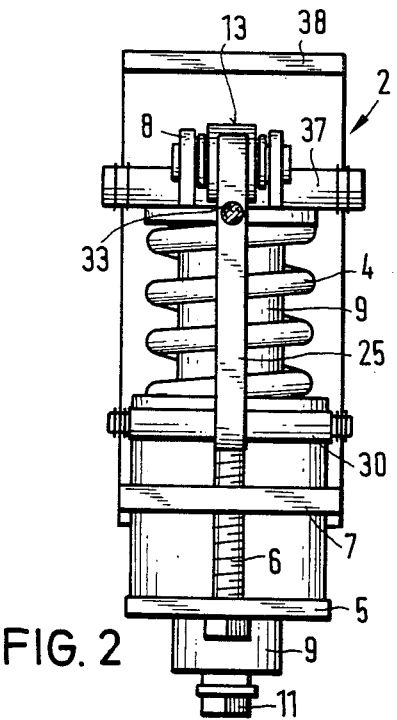
FIG. 2 is a cross-sectional view generally taken along line II—II of FIG. 1, and illustrates an adjusting screw aligned with one of the levers.

Reference is first made to FIGS. 1 and 2 of the drawings which illustrate a novel suspension device or suspension unit constructed in accordance with this invention for suspendingly supporting loads under a generally constant spring-biasing support force. The suspension device is generally designated by the reference numeral 1 and the load, though not shown, supported thereby could be, for example, a load of pipes.

The suspension device 1 includes two relatively movable portions 2, 3 for respectively being secured to a support at 38 and for being secured to the associated load. Biasing means in the form of a main load receiving spring 4 is mounted between the portion or housing 2 and the load-bearing portion 3. The spring 4 has a lower end portion (unnumbered) seated upon a lower thrust block 5 which is adjustably connected by threaded bolts 6 to lower internally threaded cross pieces 7 which span and are welded to opposite walls (unnumbered) of the housing 2.

An opposite upper end portion (unnumbered) of the spring 4 seats against a head piece 8 which carries a sleeve 9 of the load-bearing portion 3. The sleeve 9 projects beyond and through an opening (unnumbered) of the thrust block 5 and carries an end plate or cap 10 which is integrally formed or welded to the sleeve 9. The cap or plate 10 has an opening in which is received a bolt 11 having an enlarged head (unnumbered). The head (unnumbered) of the bolt 11 and the opening (unnumbered) of the plate 10 are curved to permit the bolt or internally thread stem 11 to oscillate relative to each other. The load which is to be carried is threaded by a bolt or the like to the internal threaded bolt or stem 11. The head 8 also carries cam follower means 13, 14 in the form of rollers which are secured to the head piece 8 by pins 12. A transverse bolt 37 is also carried by the head 8 and is received in opposite vertical slots (not shown) formed in opposite walls of the housing 2. The transverse bolt 37 is thereby guided vertically during movement of the sleeve 9 and, hence, maintains the sleeve 9 longitudinally stable and vertically aligned during any reciprocal motion of the sleeve 9 when the overall suspension device is in operation.

Compensatory means 16, 17 including respective spring means 18, 19 are provided for compensating for variations in the tension and/or compression forces of the main biasing means or spring 4. The compensatory spring means 16, 17 include two compression springs 18, 19, each having axes disposed generally coincident to each other and normal to the axis of the main spring 4, as is rather apparent from FIG. 1 of the drawings. The purpose of the springs 18, 19 is to maintain the force of the spring 4 constant relative to the load force imposed upon the same by whatever load might be connected thereto through the oscillating bolt or threaded sleeve 11. The springs 18, 19 are sandwiched or mounted between thrust plates or thrust blocks 20, 21, and 22, 23, respectively. The thrust blocks 20, 22 are positioned adjacent respective walls 2a, 2a of the housing 2 which have perforations or apertures 35, 36, respectively, through which a tool can be inserted to rotate a threaded bolt 33, 34 threadably carried by the respective thrust blocks 21, 23. The threaded bolts 33, 34 bear against end faces (unnumbered) of respective compensatory levers or cam arms 25, 26 of the respective compensatory means 16, 17. The levers 25, 26 are pivoted by pivot pins or bolts 30, 31, respectively. Upper end portion portions of the levers 25, 26 have respective cam means, cams or cam surfaces 27, 28 against which bear the respective cam followers or rollers 13, 14. The levers or arms 25, 26 are so positioned that the cams 27, 28 thereof are located immediately adjacent and between the respective springs and followers 18, 13 and 19, 14, respectively, while the pivot pins 30, 31, respectively, are located at a relatively lowermost position relative to the housing 2. This maintains the levers 25, 26 in a generally vertical or upright position and, thus, renders the housing quite compact in size, particularly in a vertical direction.

In order to obtain a zero or null position of the main spring 4, the rollers 13, 14 should be positioned at the null or central positions of the cams 27, 28, and this can be readily adjusted by simply turning the bolts 33, 34 in an appropriate direction. When in use, any vertical movement of the sleeve 9 due to the force of the load is compensated for by the movement of the rollers 13, 14 along the respective cams 28, 27, either upwardly or downwardly, as the load force dictates and in this fashion the springs 18, 19 compensate for any variations in the tension/compression forces of the spring 4.

Figure 3:
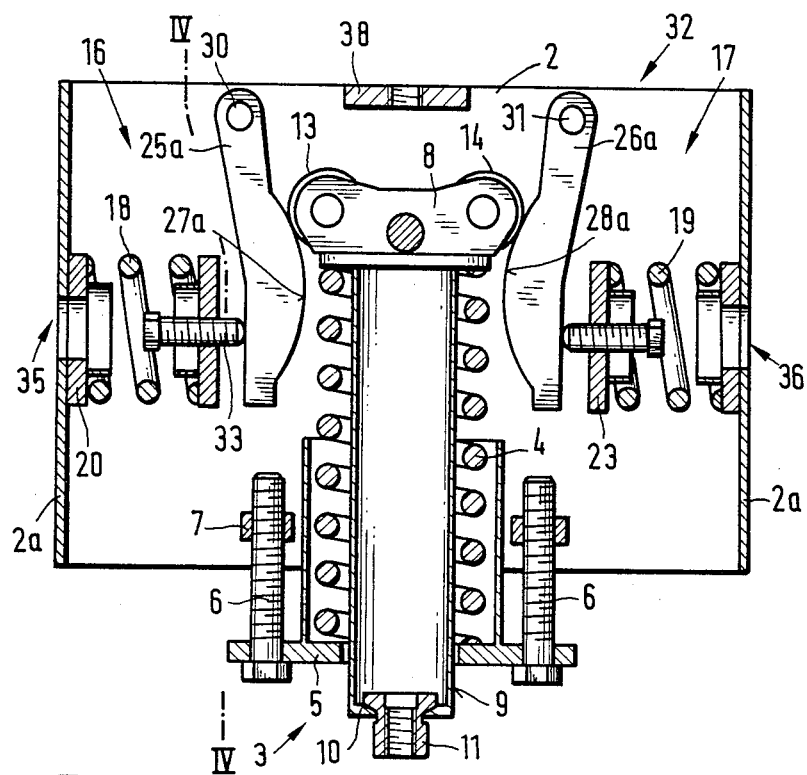
FIG. 3 is a longitudinal sectional view similar to FIG. 1, and illustrates another suspension device similar to that of FIG. 1, except in this case the levers are suspended from uppermost pivot points.
Figure 4:
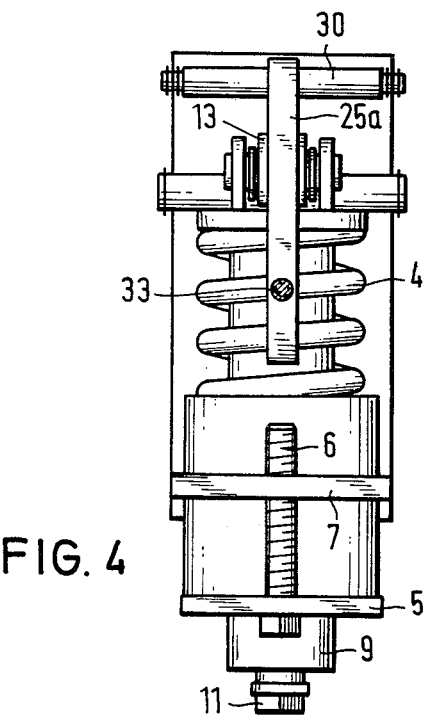
FIG. 4 is a cross-sectional view taken generally along line IV—IV of FIG. 3, and likewise illustrates a pivot point of one of the levers and an adjustment screw associated therewith.

Reference is now made to FIGS. 3 and 4 of the drawings which illustrate another suspension device constructed in accordance with this invention which is generally designated by the reference numeral 32. In this case the levers or cam arms 25a and 26a correspond identically to the levers 25, 26 except that the pivot or pivot pins 30, 31 are disposed adjacent an uppermost end portion of the housing 2. The followers or rollers 13, 14 will still, of course, move along respective cam surfaces 27a, 28a of the respective cam arms or levers 25a, 26a. In all other regards the suspension device of FIGS. 3 and 4 is identical of the suspension device 1 of FIGS. 1 and 2 and is just as equally compact in size, particularly in a vertical direction, even though the pivot pins 30, 31 of FIGS. 3 and 4 have been moved to an uppermost rather than in the lowermost position in FIGS. 1 and 2.

Figure 5:
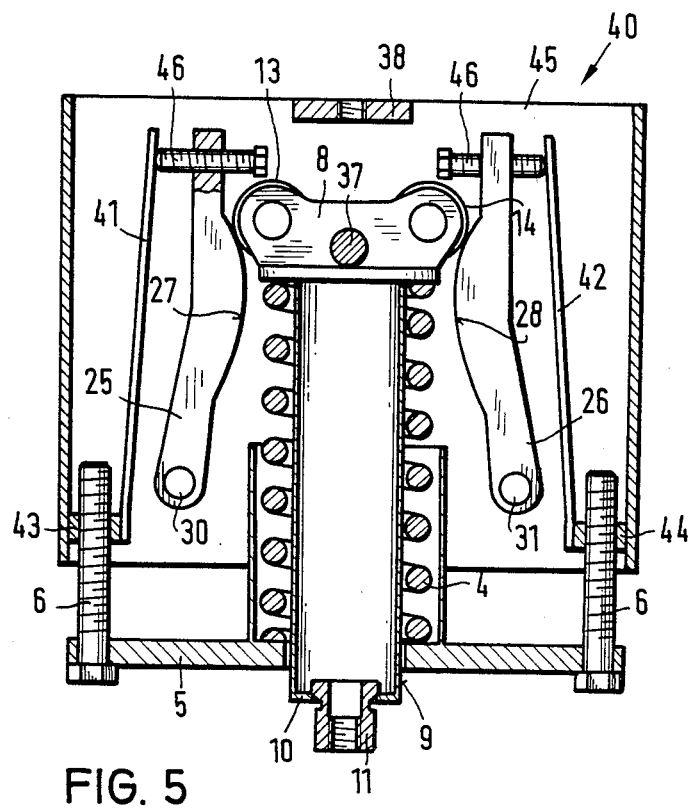
FIG. 5 is another longitudinal sectional view of another suspension device, and illustrates leaf springs associated with each of the levers.
Figure 6:
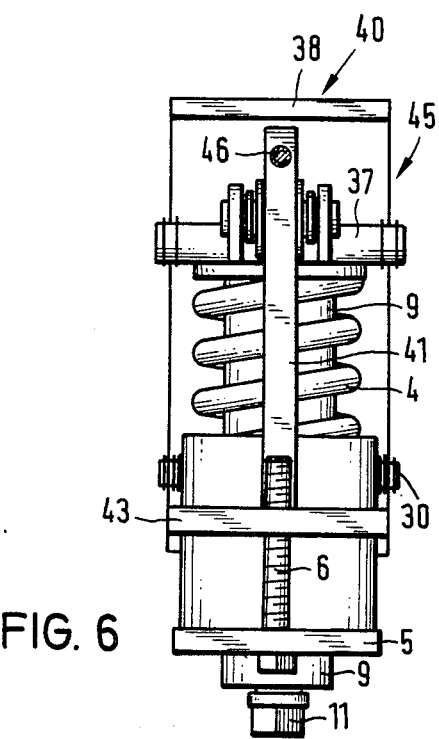
FIG. 6 is a vertical sectional view similar to FIGS. 2 and 4, and illustrates details of the suspension device of FIG. 5.

In the embodiment of the invention shown in FIGS. 5 and 6, a suspension device 40 is once again similar to the suspension device 1 of FIGS. 1 and 2, except that the compensatory springs are leaf springs 41, 42 instead of compression springs or helical springs, such as the springs 18 and 19 heretofore described. The leaf springs may be a single leaf or more than one leaf (laminar leaf springs) and lower ends (unnumbered) of the leaf springs 41 and 42 are fixed to lugs 43, 44 which are in turn welded or otherwise secured to the housing (unnumbered) of the suspension device 40. The lugs 43, 44 also have internal threads for receiving the bolts 6, 6 of the thrust block 5 to effect adjustment much in the same manner as shown in FIGS. 1 through 4 of the drawings. Adjusting elements in the form of threaded bolts 46, 46 are received in threaded bores (unnumbered) at upper end portions of the cam arms 25, 26. The ends of the bolts 46, 46 bear against upper ends of the leaf springs 41, 42 to change the spring pressure thereof and thereby vary the compensatory spring loading of the main spring system.

Although in a preferred embodiment of the invention as has been specifically illustrated and described herein, it is to be understood that minor variations may be made in the apparatus without departing from the spirit and scope of the invention, as defined in the appended claims.

I claim:

1. A suspension device for suspendingly supporting loads under a generally constant spring-biasing support force comprising two relatively movable portions, a first of said portions being adapted to be secured to a support and a second of said portions being adapted to be secured to a load to be suspendingly supported thereby, main biasing means for biasingly mounting said first and second portions relative to each other, compensatory spring means for compensating for variations in tension and/or compression forces of said main biasing means, said compensatory spring means including at least one spring mounted between said first and second portions, a lever, means for mounting said lever for pivoting movement relative to and between said one spring and said second portion, and cooperatively engagable cam and cam follower means carried by said lever and said second portion for compensating the tension and/or compression forces of said main biasing means dependent upon the load secured to the second portion and, thus, the relative position of the cam follower means upon the cam means.

2. The suspension device as defined in claim 1 wherein said cam means is carried by said lever and said cam follower means is carried by said second portion.

3. The suspension device as defined in claim 1 wherein said lever is disposed in a generally upright position.

4. The suspension device as defined in claim 1 wherein said main biasing means is disposed in a generally upright position and includes upper and lower portions, said cam and cam follower means are disposed generally adjacent said main biasing means upper portion, and said pivot mounting means is located above said biasing means upper portion.

5. The suspension device as defined in claim 1 wherein said main biasing means is disposed in a generally upright position and includes upper and lower portions, said cam and cam follower means are disposed generally adjacent said main biasing means upper portion, and said pivot mounting means is located between said biasing means upper and lower portions.

6. The suspension device as defined in claim 1 including means for adjusting the force of said one spring relative to said lever.

7. The suspension device as defined in claim 1 including means carried by one of said one spring and lever and bearing against another of said one spring and lever for adjusting the force of said one spring relative to said lever.

8. The suspension device as defined in claim 1 wherein said cam means is carried by said lever and said cam follower means is carried by said second portion, and said cam follower is a roller.

9. The suspension device as defined in claim 1 wherein said one spring is a helical spring.

10. The suspension device as defined in claim 1 wherein said one spring is a leaf spring.

11. The suspension device as defined in claim 1 wherein said first and second portions are movable relative to each other along a generally vertical path of travel established by movement of said second portions, and said one spring creates a line of force generally transverse to said vertical path of travel.

12. The suspension device as defined in claim 1 wherein said first and second portions are movable relative to each other along a generally vertical path of travel established by movement of said second portions, said one spring creates a line of force generally transverse to said vertical path of travel, and said pivot mounting means includes an axis disposed generally normal to said vertical path of travel.

13. The suspension device as defined in claim 1 wherein said second portion is a generally upright elongated support member, said main biasing means is a main spring which normally biases said support member in an upward direction, said support member having an upper end portion, and one of said cam and cam follower means being carried by said support member upper end portion.

14. The suspension device as defined in claim 1 wherein said second portion is a generally upright elongated support member, said main biasing means is a main spring which normally biases said support member in an upward direction, said support member having an upper end portion, one of said cam and cam follower means being carried by said support member upper end portion, and said lever is positioned between said support member upper end portion and said one spring.

15. The suspension device as defined in claim 1 wherein said second portion is a generally upright elongated support member, said main biasing means is a main spring which normally biases said support member in an upward direction, said support member having an upper end portion, one of said cam and cam follower means being carried by said support member upper end portion, said lever is positioned between said support member upper end portion and said one spring, and said one spring is a helical spring.

16. The suspension device as defined in claim 1 wherein said second portion is a generally upright elongated support member, said main biasing means is a main spring which normally biases said support member in an upward direction, said support member having an upper end portion, one of said cam and cam follower means being carried by said support member upper end portion, said lever is positioned between said support member upper end portion and said one spring, and said one spring is a leaf spring.

17. The suspension device as defined in claim 15 including means for adjusting the force of said helical spring relative to said lever.

18. The suspension device as defined in claim 17 wherein said adjusting means is at least partially within and is carried by said helical spring.

19. The suspension device as defined in claim 16 including means for adjusting the force of said leaf spring relative to said lever.

20. The suspension device as defined in claim 19 wherein said adjust means is carried by said lever and bears against said leaf spring.

* * * * *